(12) United States Patent
Mishra et al.

(10) Patent No.: US 11,937,142 B2
(45) Date of Patent: Mar. 19, 2024

(54) REAL-TIME ANY-G SON

(71) Applicant: Parallel Wireless, Inc., Nashua, NH (US)

(72) Inventors: Rajesh Kumar Mishra, Westford, MA (US); Michael Silva, East Sandwich, MA (US)

(73) Assignee: Parallel Wireless, Inc., Nashua, NH (US)

(*) Notice: Subject to any disclaimer, the term of this patent is extended or adjusted under 35 U.S.C. 154(b) by 0 days.

(21) Appl. No.: 17/492,555

(22) Filed: Oct. 1, 2021

(65) Prior Publication Data

US 2022/0030491 A1   Jan. 27, 2022

Related U.S. Application Data

(63) Continuation-in-part of application No. 17/061,575, filed on Oct. 1, 2020, which is a continuation-in-part of application No. 16/528,616, filed on Jul. 31, 2019, now Pat. No. 11,650,862.

(60) Provisional application No. 62/908,837, filed on Oct. 1, 2019.

(51) Int. Cl.
| | |
|---|---|
| *G06F 7/06* | (2006.01) |
| *H04L 12/46* | (2006.01) |
| *H04W 36/18* | (2009.01) |
| *H04W 88/16* | (2009.01) |
| *H04W 84/18* | (2009.01) |

(52) U.S. Cl.
CPC ......... *H04W 36/18* (2013.01); *H04L 12/4641* (2013.01); *H04W 88/16* (2013.01); *H04W 84/18* (2013.01)

(58) Field of Classification Search
CPC ..... H04W 36/18; H04W 88/16; H04W 84/18; H04W 24/02; H04L 12/4641; H04L 41/0809; H04L 41/145; H04L 43/0817; H04L 41/0895
See application file for complete search history.

(56) References Cited

U.S. PATENT DOCUMENTS

| | | |
|---|---|---|
| 8,510,426 B2 | 8/2013 | Mercuri |
| 8,532,820 B1 | 9/2013 | Sampath |
| 8,589,481 B2 | 11/2013 | Das et al. |
| 8,620,879 B2 | 12/2013 | Cairns |

(Continued)

FOREIGN PATENT DOCUMENTS

| | | |
|---|---|---|
| EP | 2773151 A1 | 9/2014 |
| WO | 2013145592 A1 | 10/2013 |
| WO | 2019034805 A1 | 2/2019 |

OTHER PUBLICATIONS

Dino Quintero et al. "IBM Software Defined Environment", Dino hereinafter, Aug. 2015. (Year: 2015).*

(Continued)

*Primary Examiner* — Kevin L Young
*Assistant Examiner* — Abdou K Seye
(74) *Attorney, Agent, or Firm* — Michael Y. Saji

(57) ABSTRACT

Systems, method sand computer readable medium are provided for proving real-time Self Optimizing Network (SON) Virtual Network Function (VRF) included as part of the HNG. In one embodiment data from connected devices is forwarded to the HNG; the data is organized into virtualized containers; and the data is processed by agile analytics and results are displayed to a user.

18 Claims, 14 Drawing Sheets

(56) References Cited

U.S. PATENT DOCUMENTS

| | | | |
|---|---|---|---|
| 8,838,556 | B1 | 9/2014 | Reiner et al. |
| 8,867,418 | B2 | 10/2014 | Mishra et al. |
| 8,879,416 | B2 | 11/2014 | Mishra et al. |
| 9,141,908 | B1 | 9/2015 | Reiner et al. |
| 9,455,959 | B1 | 9/2016 | Garg et al. |
| 9,456,011 | B1 | 9/2016 | Nick et al. |
| 9,477,691 | B1 | 10/2016 | Reiner et al. |
| 9,588,815 | B1 | 3/2017 | Mistry et al. |
| 9,832,796 | B2 | 11/2017 | Mehta |
| 10,129,158 | B2 | 11/2018 | Garg |
| 10,595,242 | B2 | 3/2020 | Rao et al. |
| 10,924,943 | B2 * | 2/2021 | Chou .................. H04W 24/02 |
| 11,544,211 | B2 | 1/2023 | Katzav et al. |
| 2011/0044285 | A1 | 2/2011 | Jang et al. |
| 2013/0016657 | A1 | 1/2013 | Muhanna et al. |
| 2013/0159395 | A1 | 6/2013 | Backholm et al. |
| 2013/0185439 | A1 | 7/2013 | Velasco |
| 2013/0198180 | A1 | 8/2013 | Channing |
| 2013/0282227 | A1 | 10/2013 | Chen et al. |
| 2013/0346558 | A1 | 12/2013 | Khalidi et al. |
| 2014/0241316 | A1 | 8/2014 | Okmyanskiy et al. |
| 2015/0098387 | A1 | 4/2015 | Garg et al. |
| 2016/0029430 | A1 | 1/2016 | Mishra et al. |
| 2016/0156503 | A1 | 6/2016 | Rosa de Sousa Teixeira et al. |
| 2016/0253340 | A1 * | 9/2016 | Barth .................... G06F 16/122 707/756 |
| 2017/0055186 | A1 | 2/2017 | Donepudi et al. |
| 2017/0075693 | A1 | 3/2017 | Bishop et al. |
| 2017/0272330 | A1 | 9/2017 | Cao et al. |
| 2017/0273134 | A1 | 9/2017 | Cao et al. |
| 2017/0279770 | A1 | 9/2017 | Woolward |
| 2018/0041934 | A1 | 2/2018 | Agarwal et al. |
| 2018/0160337 | A1 | 6/2018 | Gupta et al. |
| 2018/0213441 | A1 * | 7/2018 | Mehta .................. H04W 28/082 |
| 2018/0249426 | A1 | 8/2018 | Mrozinski |
| 2018/0332485 | A1 * | 11/2018 | Senarath ............... H04L 41/044 |
| 2019/0149425 | A1 * | 5/2019 | Larish .................... G06N 3/088 706/16 |
| 2019/0238407 | A1 | 8/2019 | Papa |
| 2019/0243836 | A1 | 8/2019 | Nanda et al. |
| 2020/0045565 | A1 | 2/2020 | Tanna et al. |
| 2020/0128414 | A1 | 4/2020 | Mishra et al. |
| 2020/0252996 | A1 | 8/2020 | Mishra et al. |
| 2021/0014916 | A1 | 1/2021 | Raval et al. |
| 2021/0037449 | A1 * | 2/2021 | Bleidorn ............. H04L 41/0806 |
| 2021/0051745 | A1 | 2/2021 | Supanekar |

OTHER PUBLICATIONS

Martin Backstrom, "Drive Profitability Further with Analytics", Ericsson Research Blog, Research, Telefonaktiebolaget LM Ericsson, Nov. 25, 2016.

"Big Data Analytics", Ericsson White Paper, Uen 288 23-3211, Rev B, Telefonaktiebolaget LM Ericsson, Oct. 2015.

Moysen et al.: "From 4G to 5G: Self-organized network management meets machine learning". Computer Communications 129 (2018): 248-268.

Chen et al.: "SoftMobile: Control Evolution for Future Heterogeneous Mobile Networks", IEEE Wireless Communications, Dec. 2014.

Gemalto: "Additional Slice Isolation Requirements", 3GPP TSG SA WG3 (Security) Meeting #86Bis, Mar. 27-32, 2017, Busan, Korea.

* cited by examiner

REAL-TIME ANY-G SON

CROSS-REFERENCE TO RELATED APPLICATIONS

This application is a continuation-in-part of, and claims priority under 35 U.S.C. § 120 to, U.S. patent application Ser. No. 17/061,575, titled "Real-Time Any-G SON" and filed Oct. 1, 2020, which is itself a continuation-in-part of, and claims priority under 35 U.S.C. § 120 to, U.S. patent application Ser. No. 16/528,616, "OpenRAN and Virtualized Baseband Radio Unit" filed Jul. 31, 2019; and also claims priority under 35 U.S.C. § 119(e) to U.S. Provisional Pat. App. No. 62/908,837, entitled "Real-Time Any-G SON" and filed Oct. 1, 2019. The present application hereby incorporates by reference U.S. Pat. App. Pub. Nos. US20110044285, US20140241316; WO Pat. App. Pub. No. WO2013145592A1; EP Pat. App. Pub. No. EP2773151A1; U.S. Pat. No. 8,879,416, "Heterogeneous Mesh Network and Multi-RAT Node Used Therein," filed May 8, 2013; U.S. Pat. No. 8,867,418, "Methods of Incorporating an Ad Hoc Cellular Network Into a Fixed Cellular Network," filed Feb. 18, 2014; U.S. patent application Ser. No. 14/777,246, "Methods of Enabling Base Station Functionality in a User Equipment," filed Sep. 15, 2016; U.S. patent application Ser. No. 14/289,821, "Method of Connecting Security Gateway to Mesh Network," filed May 29, 2014; U.S. patent application Ser. No. 14/642,544, "Federated X2 Gateway," filed Mar. 9, 2015; U.S. patent application Ser. No. 14/711,293, "Multi-Egress Backhaul," filed May 13, 2015; U.S. Pat. App. No. 62/375,341, "S2 Proxy for Multi-Architecture Virtualization," filed Aug. 15, 2016; U.S. patent application Ser. No. 15/132,229, "MaxMesh: Mesh Backhaul Routing," filed Apr. 18, 2016, each in its entirety for all purposes. This application also hereby incorporates by reference in their entirety each of the following U.S. Pat. applications or Pat. App. Publications: US20150098387A1; US20170055186A1; US20170273134A1; US20170272330A1; US20180041934A1; US20200252996A1; US20200128414A1; and Ser. No. 16/853,745. This application also hereby incorporates by reference in their entirety U.S. Provisional Pat. Application No. 62/873,463, "5G Mobile Network Solution With Intelligent 5G Non-Standalone (NSA) Radio Access Network (RAN) Solution" filed Jul. 12, 2019; and U.S. Provisional Pat. Application No. 62/801,032, "Hybrid CWS Architecture," filed Feb. 4, 2019; and U.S. Pat. App. Pub. No. US20190243836A1, "Data Pipeline for Scalable Analytics and Management," filed Feb. 8, 2019.

BACKGROUND

With modern networks there is a massive amount of data available from a variety of sources including end-users, traffic and weather conditions, and the network itself. To ensure optimal optimization of the network, this information must be processed and analyzed in real-time, especially for 5G and IoT 5G and IoT.

SUMMARY

Parallel Wireless is addressing the opportunity for real-time data and analytics by bringing container virtualization and agile analytics to our virtualized approach. Parallel Wireless' multi-technology OpenRAN and Network Software suite virtualizes many essential network functions on one low-cost platform. The key VNF for Big Data and virtualized Analytics (vAnalytics) is the virtualized real-time, multi-technology SON, which can provide network data and make necessary real-time network adjustments for end-users, things, and processes running over cellular networks, especially at the edge. Being one of the functionalities on fully virtualized OpenRAN and Network Software Suite, SON will enable self-optimization and seamless mobility across any G, any haul, any slice, any service. With agile data storage and organization, predictive modeling and data mining, and real-time SON, we can enable mobile operators to manage Big Data Analytics on the same virtualized platform that manages orchestration.

The Parallel Wireless solution enables innovative capacity, coverage, and upgradeability. Parallel Wireless OpenRAN supports indoor or outdoor deployment scenarios at the lowest TCO and can be deployed on an accelerated timeline to help mobile operators deliver coverage everywhere from rural to suburban to most dense urban. Easy to install, low-cost and high-performing cloud-native Parallel Wireless OpenRAN supports macro, Massive MIMO or small cell deployments for densification and delivers superior end user QoS for consumers and industries in urban scenarios. Parallel Wireless cloud-native OpenRAN approach enables any 5G migration option and is software upgradable to any future 3GPP releases delivering the most cost-effective, easy to deploy, and advanced 5G capabilities for all 5G use cases.

In one embodiment, a real-time Self Optimizing Network (SON) Virtual Network Function (VRF) is included as part of an HNG. Data from connected devices is forwarded to the HNG; the data is organized into virtualized containers; and the data is processed by agile analytics and results are displayed to a user.

DETAILED DESCRIPTION

Figure 1:
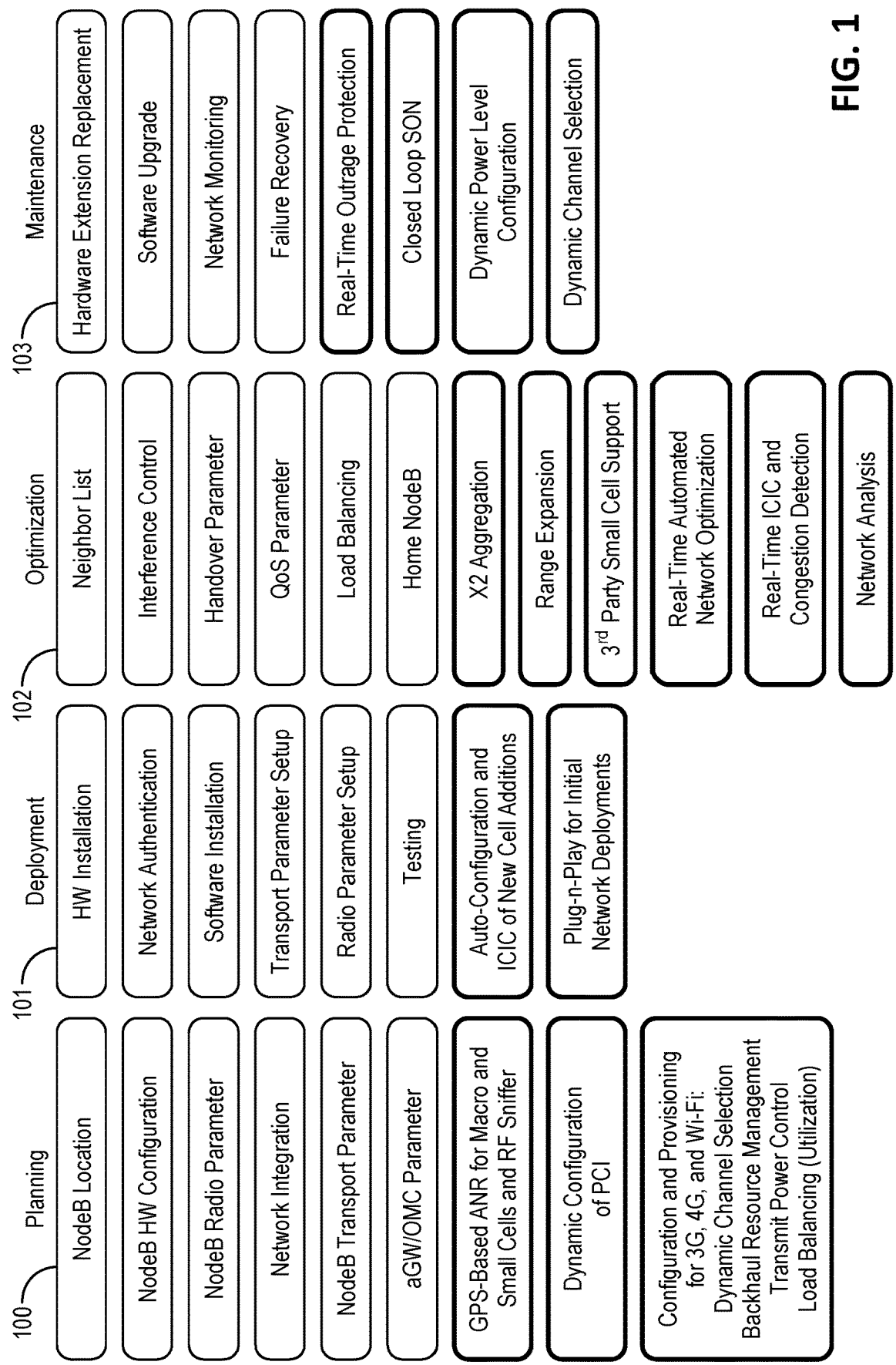
FIG. 1 is a diagram showing self-configuration plug-n-play deployments, in accordance with some embodiments.

On the access side, RAN hardware and multi-technology RAN hardware (5G/4G/3G/2G) exists. OpenRAN open protocol hardware provides the cellular access to the end-users and connected "things". While the access nodes provide access to the end-users, they are also reporting to the Analytics module about the network conditions, load on each cell, and what activities people are using their devices for.

These reports are then fed into a scalable, on-demand, virtualized container environment where it is stored and organized. With container virtualization, this solution also pulls information from the Internet such as traffic spikes, weather conditions, and time of day and adds this information to the Data Lakes created by the OpenRAN and Network Software Suite. From there, the data is analyzed and processed so it can be reported to business analysts in an easy to consume dashboard. Agile analytics then report this info back to the OpenRAN controller where it is used to determine how best to optimize the network for peak performance. By analyzing the data in real-time, this solution utilizes virtualized analytics to improve network operation, provide a better customer experience, reduce churn, and increase profitability for mobile operators.

On the network side, OpenRAN and Network Software Suite can anticipate the change in network conditions that result from the route change. In this example, OpenRAN software anticipates that because the bus is travelling along a new route, passing within the coverage area of a nearby base station, there is now a need for more capacity on said base station due to the increase of users arriving on the bus. By anticipating this user increase, OpenRAN software automatically offloads some existing users to a neighboring base station, thus reducing congestion. This instantly creates more capacity for the incoming users without impacting the other users on the cell. As a result of this solution, the city benefits from having fewer breakdowns, the buses benefit from having optimized routes, and the end-users benefit from having an optimized experience.

Deployment Options

This solution can be used in any network deployment or scenario and will be increasingly applicable as the industry migrates to 5G. For example, this virtualized analytics solution could be used for smart fleet management. In this example, information about road and traffic conditions and vehicle health is gathered and reported to the fleet management center. This in turn increases efficiency since the fleet management center can monitor the status of the vehicle and recall that bus for repair before a breakdown occurs. By monitoring the traffic conditions, the buses can automatically be rerouted to the most efficient route.

This solution can also be used for public safety. One example of this would be where OpenRAN and Network Software Suite pulls weather information from the Internet and determines that a potential storm is about to hit an area. To create additional capacity for emergency responders trying to help and rescue those affected by the storm, OpenRAN software can use traffic prioritization and authentication capabilities in conjunction with the vAnalytics solution to ensure that first responders always have a secure connection in order to protect and serve.

As a result of this solution, global mobile operators will be able to manage their Big Data Analytics under the same Network Function Virtualization (NFV) orchestration umbrella and bring real-time visibility into their networks to improve operational efficiency and reduce cost while improving end-to-end experience and creating new revenue opportunities.

Analytics

As the OpenRAN Network Controller unifies and abstracts the RAN while orchestrating it in real-time, making it self-configuring, self-optimizing, and self-healing, any RAN additions to the network are done quickly, without specialized staff and without compromising end user QoE. Parallel Wireless SON software module provides the benefits of hands-free, automatic network configuration, optimization and management. As this SON solution works in a closed-loop, it is able to take feedback from the network into account and automatically revert back to the last working state in the case of network degradation, all without any human intervention. Decisions are made in real-time to provide end-users with more consistent, seamless experience: users experience faster handoff, session continuity, and less dropped calls. This solution is completely interoperable with any technology (5G, 4G, 3G, 2G, and Wi-Fi). X2-based Inter-cell Interference Coordination (ICIC) functionality improves the cell-edge experience, as SON mitigates interference to ensure optimal QoE for each subscriber. As this SON solution improves the network performance as well as resource and spectrum utilization, it ultimately provides the benefits of energy and cost savings to the operator and improved QoE for the end-user.

Parallel Wireless SON module features include: Multi-technology network SON; Operates in real-time; Built on automation and programmability principles of SDN; Uses standard XML, REST and YANG based interfaces; Open-APIs integration with macro SON dynamically and in real-time; Self-Optimizing Network with load balancing, mobility and ANR neighbor management; Self-healing; and Carrier-grade.

FIG. 1 shows steps for plug-n-play deployments. These include planning items 101, deployment items 102, optimization items 103 and maintenance items 104.

The self-configuration feature of SON enables new cells to be added and configured using a plug-n-play approach. Self-configuration capabilities reduce the level of installer input and costs, ensures that cells integrate correctly into the network, and ensure there is no error while the configuration is being carried out. As cellular networks become denser, changes and configuration to hardware and software (including the deployment of new network elements) becomes more complicated.

The self-configuration feature of Parallel Wireless SON software module covers the complete life cycle of the cell for any technology (2G/3G/4G/Wi-Fi) and any vendor. SON self configuration feature identifies the new cells in the network, which allows SON to run the smart algorithm for hands-free configuration and reduces the time to "Activate Services" for mobile operators resulting in reduction of the deployment CAPEX.

Initial PCI and RACH configuration parameters are calculated in real-time based on automatic PCI calculations. Also, initial Neighbor List table for intra or inter frequency and IRAT neighbors are calculated for each cell. Transmit power optimization is performed for new cells. Each cell's hardware and software inventory are automatically managed which helps mobile operators easily maintain inventory lists and plan for future upgrades.

Self-Optimization Features and Benefits

With densification of mobile networks, there are multiple layers of radio technologies, frequencies and vendor equipment. As the data usage rise, this makes it nearly impossible to cost-effectively manage, create, and optimize neighbor relations between these outdoor and indoor coverage layers. Coverage holes can also occur due to bad RF planning, ever-changing traffic patterns, user density, or "sleeping" cells. Handover failures, service drops, and undesirable handovers also deteriorate the user experience and wastes network resources.

The self-optimization features of Parallel Wireless SON include: Automatic Neighbor Relations (ANR) to support neighbor list relations between any technology to help to reduce drop rate, improve handover success rate and user experience, and better utilize network resources; PCI Conflict and Confusion Avoidance to create a pro-active solution to optimize the network; Load Balancing and Traffic Steering to help transfer traffic from overloaded outdoor or indoor cells to a neighboring cell to ensure even load distribution and as a result, provides more efficient network resource management to the operator and enhances QoS/QoE for the end-users; Coverage Capacity Optimization (CCO) to enhance the coverage footprint or to reduce it by either TX power or E-Tilt optimization; Mobility Robustness Optimization to assist with dynamic handover optimization to Improve and optimize handover success rate, user experience, handover interruption time, and average cell edge throughput; Paging Optimization to reduce paging signaling; RACH Optimization to enhance the uplink coverage and manage UL users capacity; and Inter Cell Interference Coordination (ICIC) and eICIC to reduce and mitigate interference between cells.

These features enable real-time self-optimization of the network to bring additional coverage and capacity and enhance the user experience. In addition, self-healing capabilities provide network resilience by instructing neighboring cells to compensate coverage for the cell that went down and deliver hands-free maintenance for cell outages to ensure consistent and reliable experience to the end users.

Figure 2:
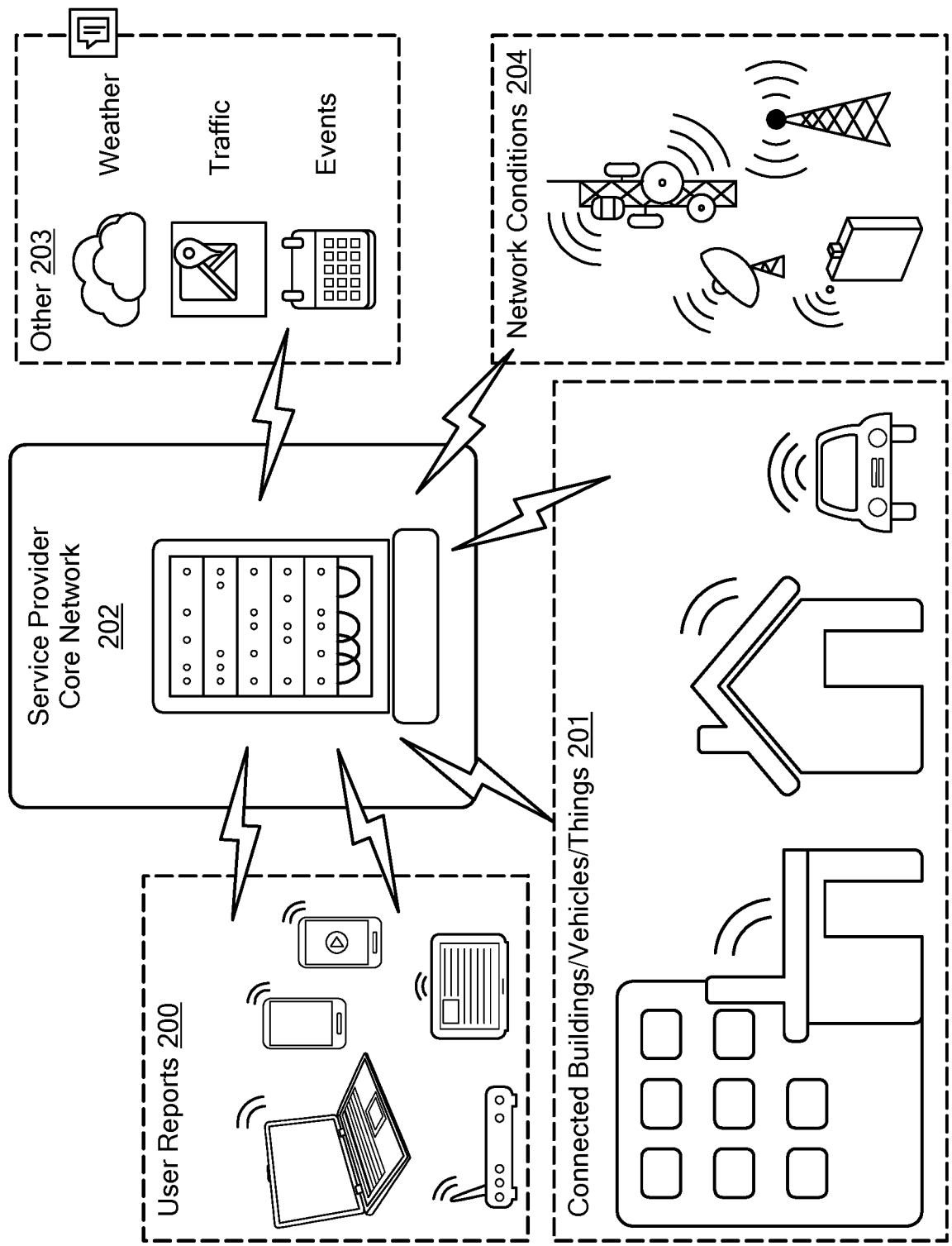
FIG. 2 is a diagram showing an environment using predictive analysis, in accordance with some embodiments.

FIG. 2 is a schematic diagram showing an environment using predictive analysis, in accordance with some embodiments. Service provider core network 202 integrates inputs from user reports 200, connected buildings/vehicles/things 201, network conditions 204, and other inputs 203 to provide SON optimization.

Continuing, virtualized analytics include real-time, virtualized SON; provides network information; and adjusts network based on big data reports. Container virtualization includes virtualized, scaleable container architecture; and organizes and manages data from outside sources. Agile analytics analyzes and processes data; presents data in consumable dashboard and uses industry-leading query speeds.

Figure 3:
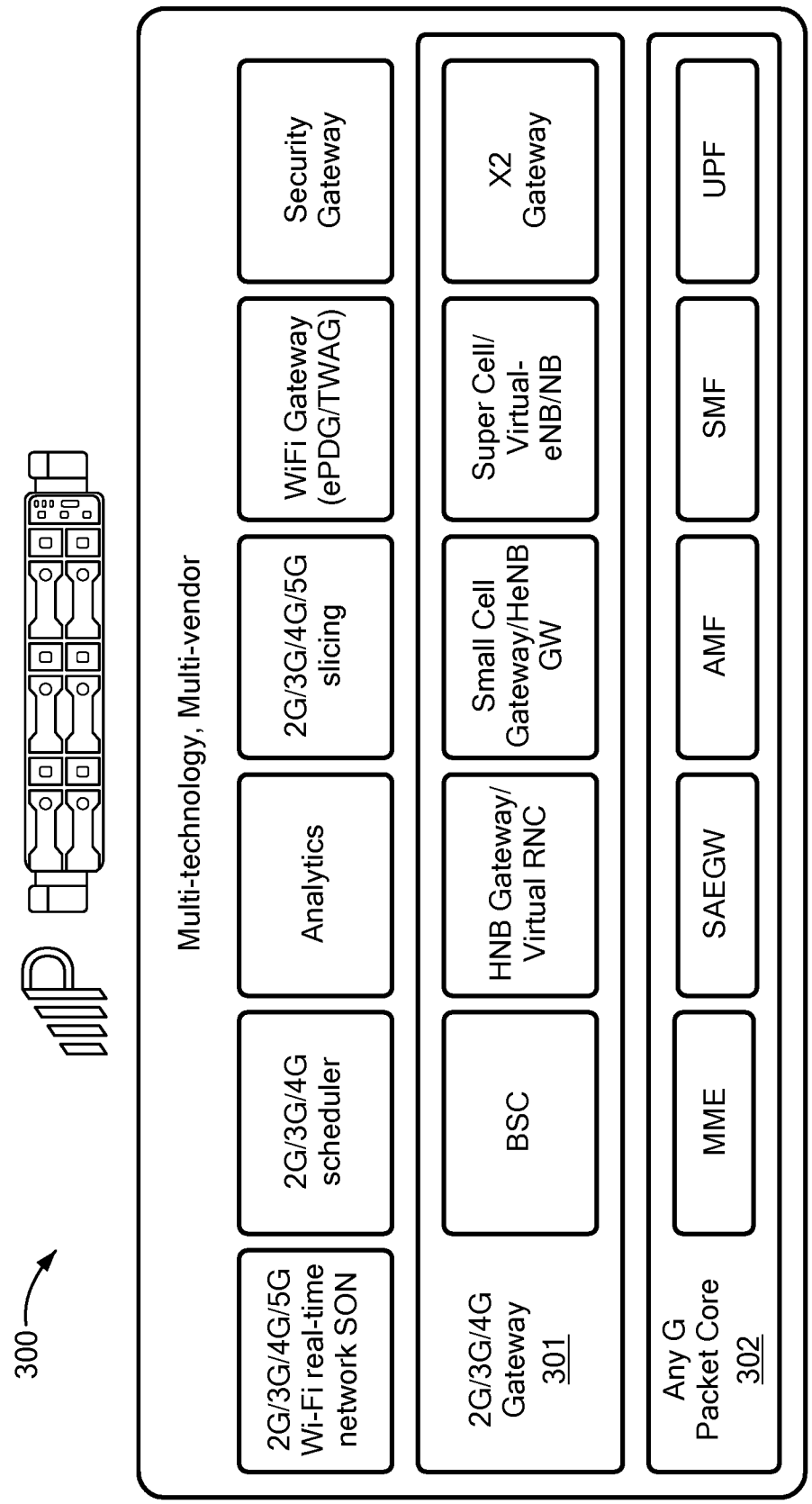
FIG. 3 is a diagram showing virtual network functions on virtualization platforms, in accordance with some embodiments.

FIG. 3 schematically shows virtual network functions 300 on virtualized platforms. The software incorporates numerous Virtual Network Functions (VNFs) such as SON, Security Gateway (SeGW), ePDG and operates on numerous virtualization platforms. The SON VNF provides network data and makes necessary real-time network adjustments for end users, things and processes running over cellular networks, especially at the edge. SON will enable self-optimization and seamless mobility across any G, and haul, any slice, and any service. A 2G/3G/4G gateway 301 provides certain functions, including 2G BSC, 4G gateways, etc. in virtual network functions. As well, an any-G packet core 302 also provides other functions as virtual network functions. These may all be running on the same physical hardware, or in a data center, etc. with only a limited set of features operating on the base station (not shown).

Figure 4:
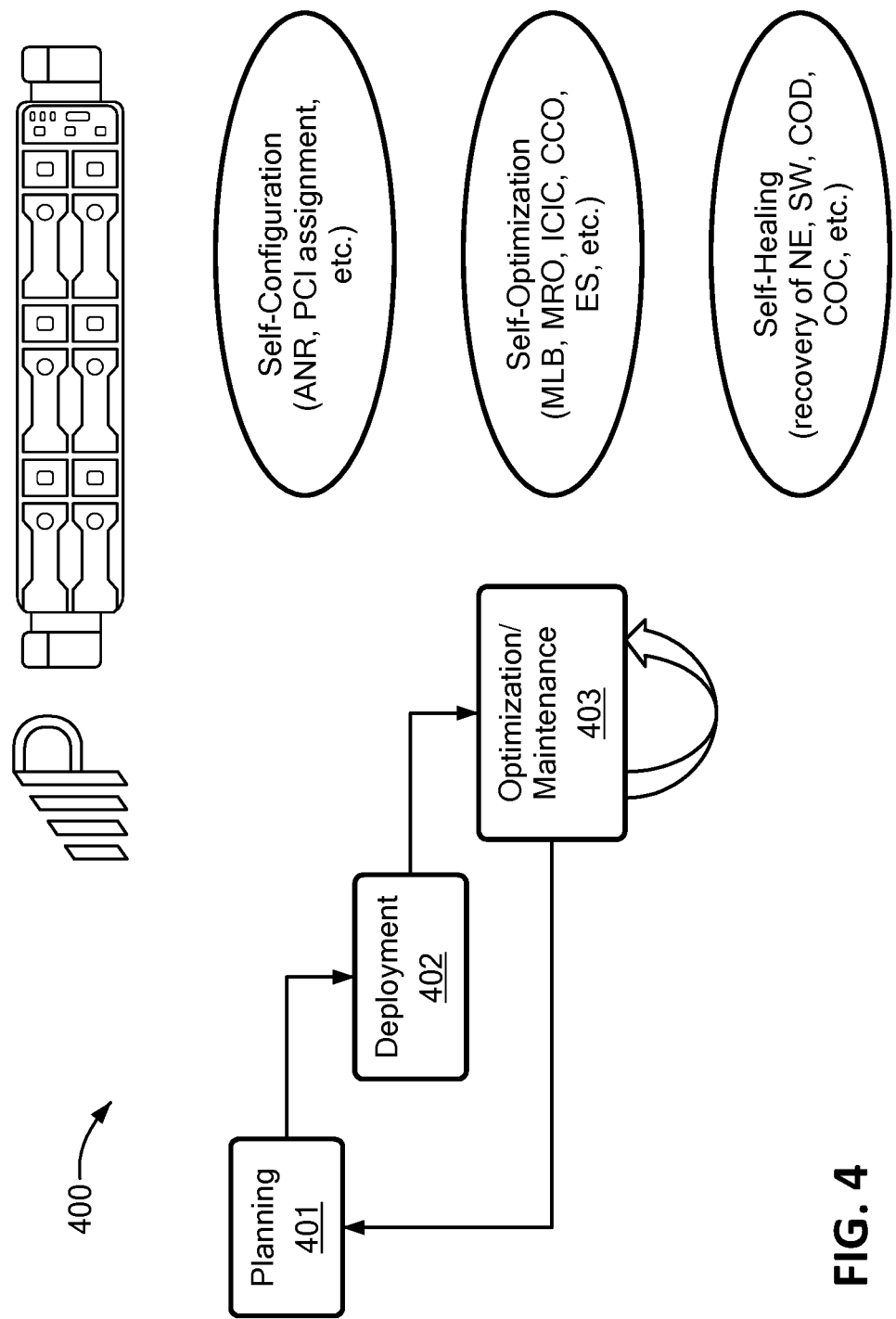
FIG. 4 is a diagram showing SON automation, in accordance with some embodiments.

FIG. 4 schematically shows an automation waterfall 400. The more intelligent SON provides real-time network data combined with other data. Self-learning network, self-adjusting network, machine learning SON and network automation are provided via a waterfall of planning 401, to deployment 402, to optimization/maintenance 403, leading to a steady state that enables further planning. Self-configuration, self-optimization, and self-healing are enabled to be provided. Real-time may include semi-real time or periodic, but the cycle time is enabled by the architecture as described below.

Figure 5:
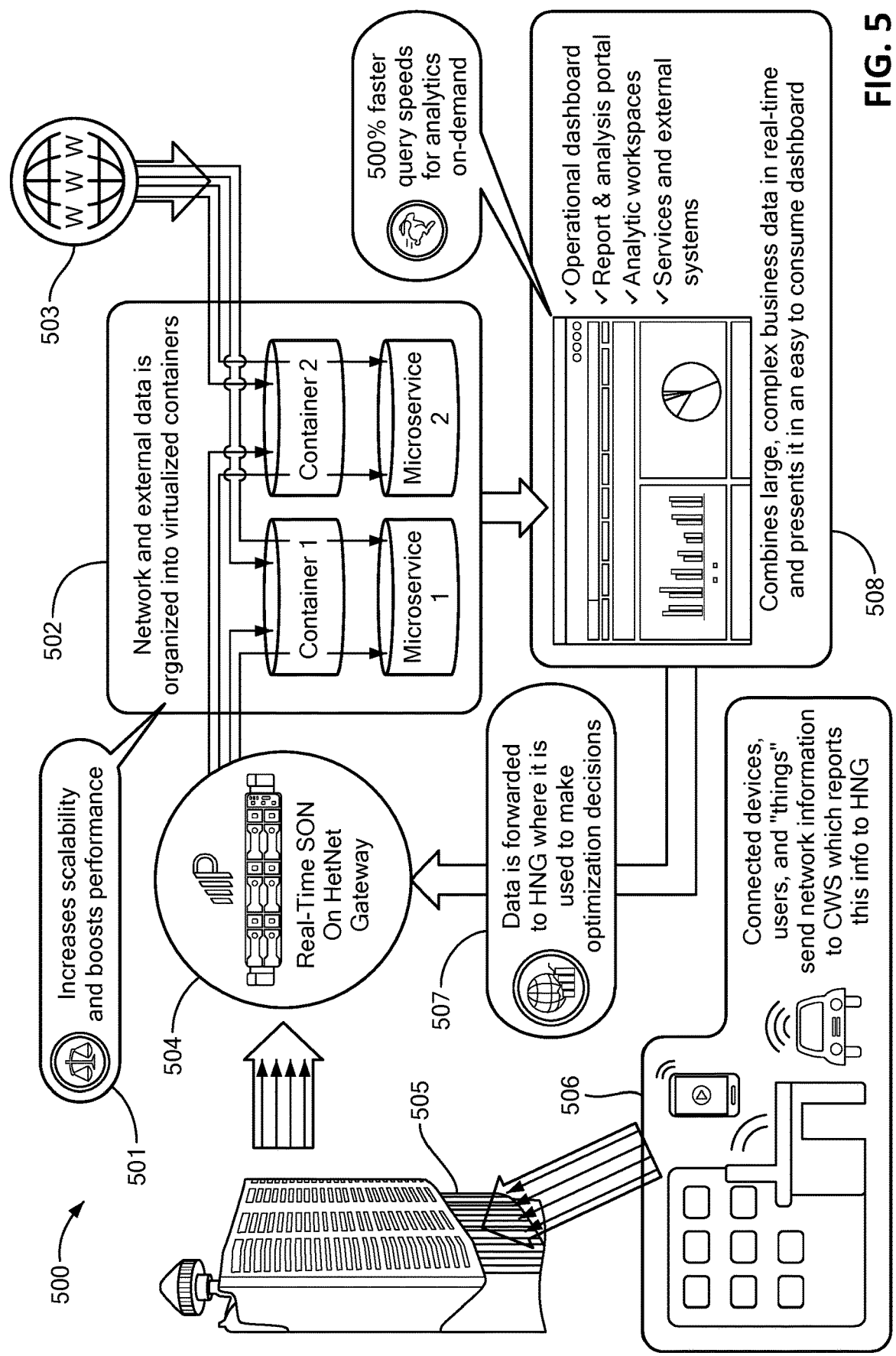
FIG. 5 is a diagram showing an environment using real-time SON on a Hetnet Gateway or HNG, in accordance with some embodiments.

FIG. 5 is a diagram showing an environment 500 using real-time SON on an HNG. Data 505, 506 is forwarded to the HNG 504 where it is used to make optimization decisions. The network and external data is organized into virtualized containers 502 where it is combined in real-time and presented in a dashboard 508. Some data 507 is cycled back from the dashboard as instructions to the HNG 504.

Figure 6:
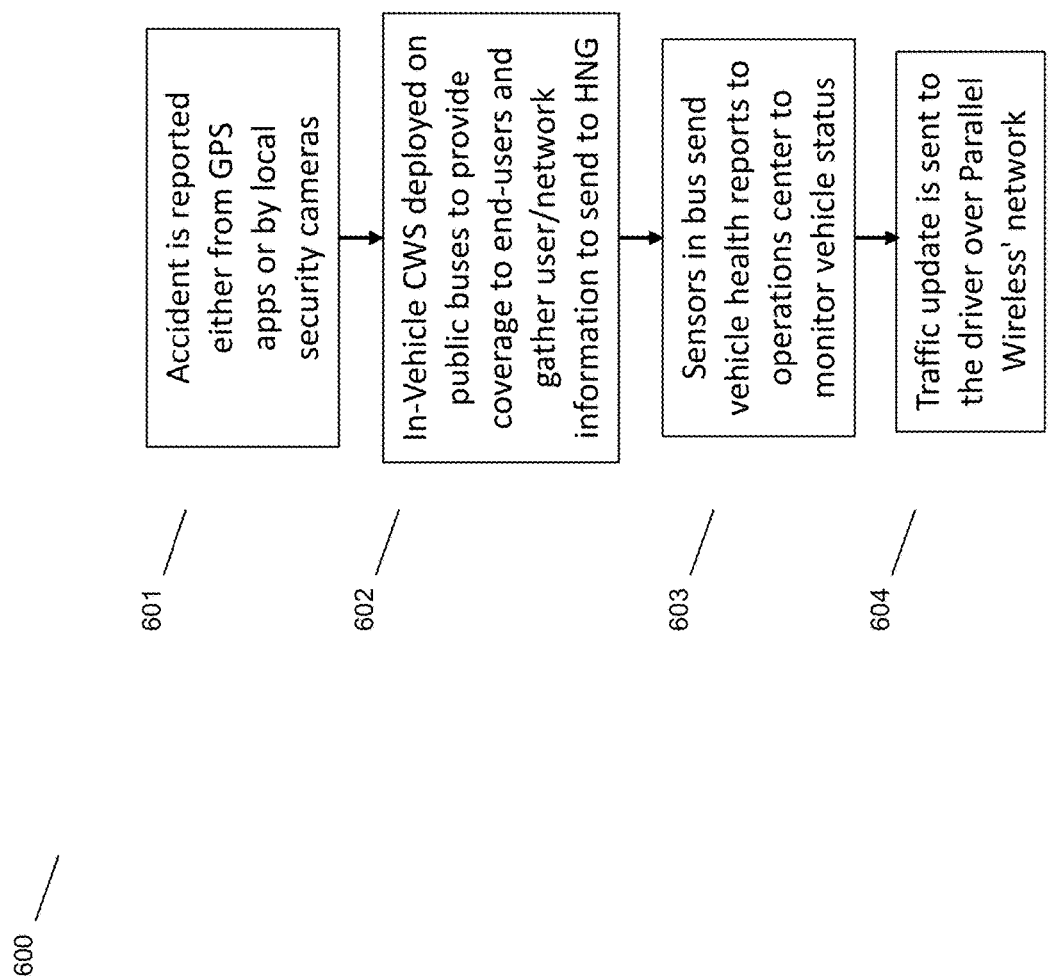
FIG. 6 is a diagram showing dashboard reporting, in accordance with some embodiments.
Figure 7:
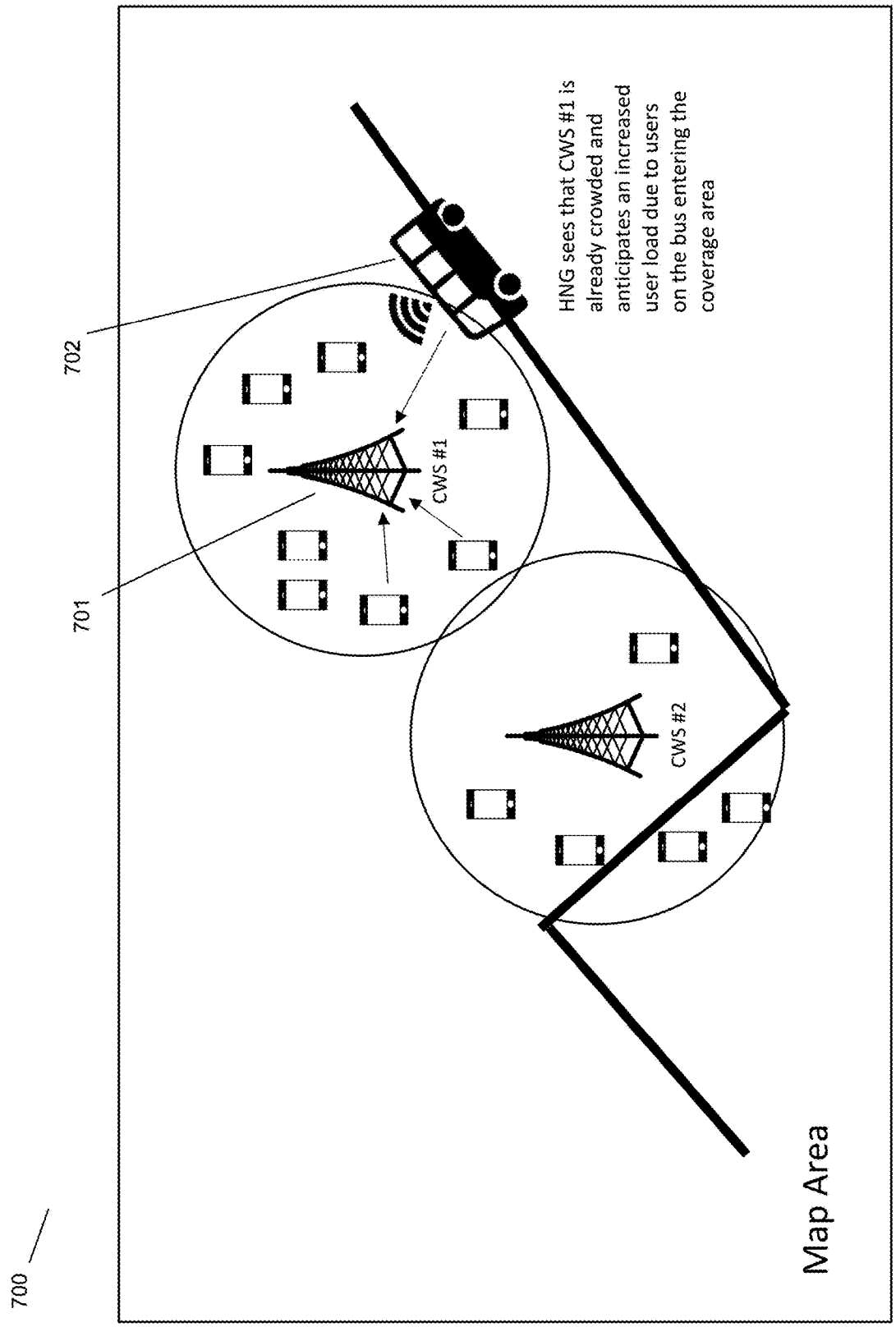
FIG. 7 is a first diagram showing real-time network adjustments, in accordance with some embodiments.
Figure 8:
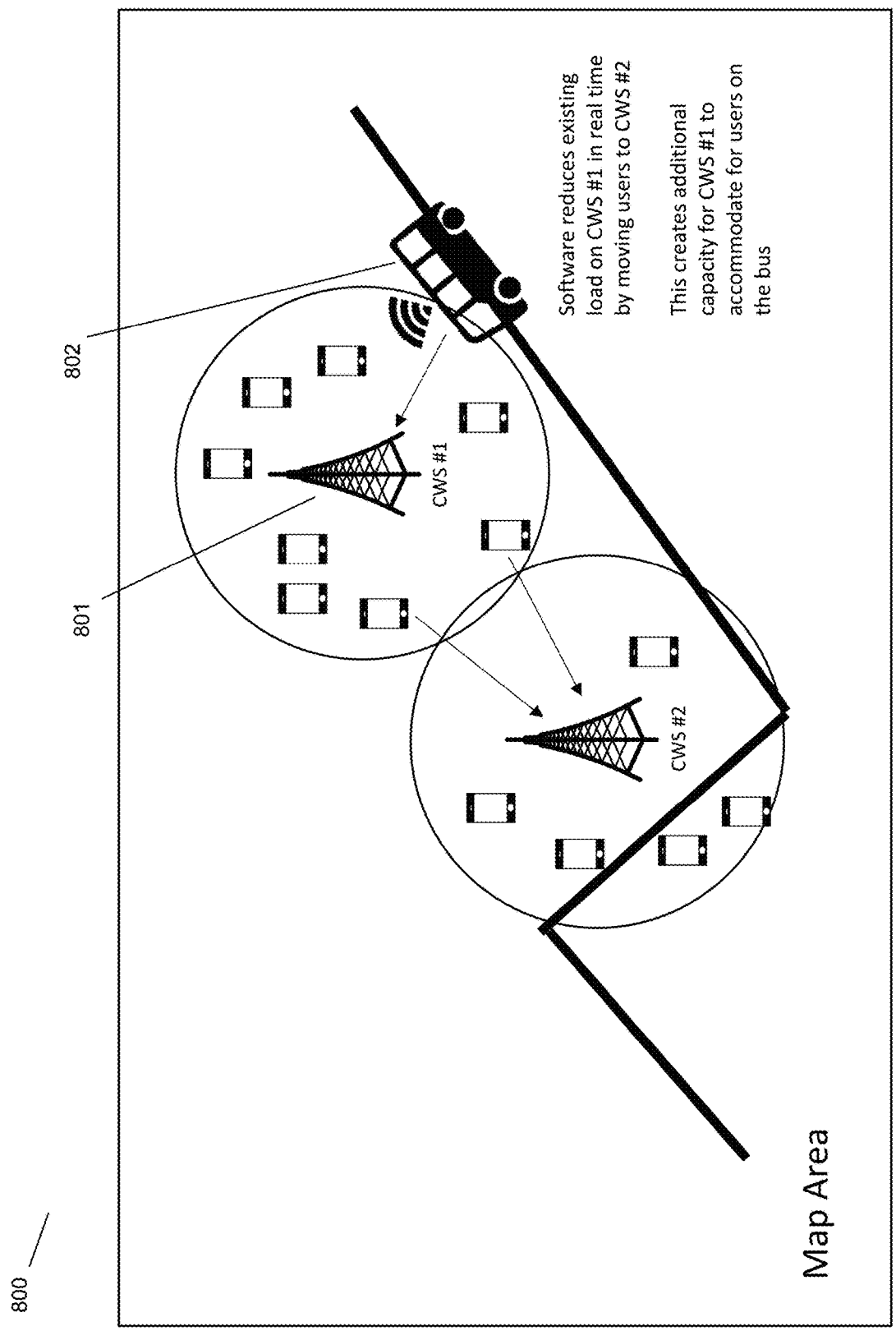
FIG. 8 is a second diagram showing real-time network adjustments, in accordance with some embodiments.

FIG. 6 shows an example dashboard reporting 600. FIG. 7 shows a first part 700 of real-time network adjustments. FIG. 8 shows a second part 800 of the real-time network adjustments.

In this example shown in FIGS. 7-8, OpenRAN software anticipates that because the bus is travelling along a new route, passing within the coverage area of a nearby base station, there is now a need for more capacity on said base station due to the increase of users arriving on the bus. By anticipating this user increase, OpenRAN software automatically offloads some existing users to a neighboring base station, thus reducing congestion. This instantly creates more capacity for the incoming users without impacting the other users on the cell. As a result of this solution, the city benefits from having fewer breakdowns, the buses benefit from having optimized routes, and the end-users benefit from having an optimized experience.

Figure 9:
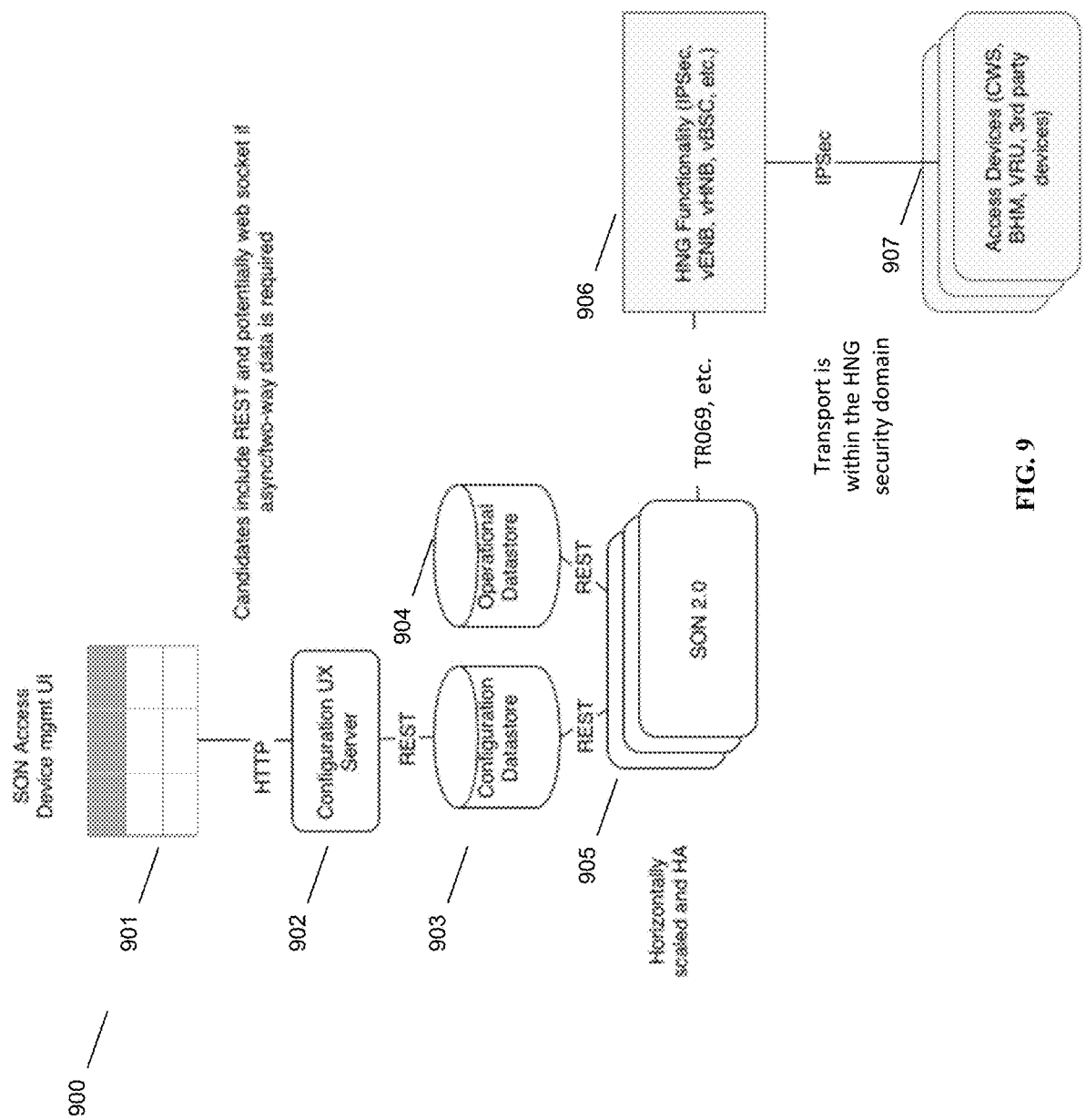
FIG. 9 is a first diagram showing a network architecture of a SON deployment, in accordance with some embodiments.
Figure 10:
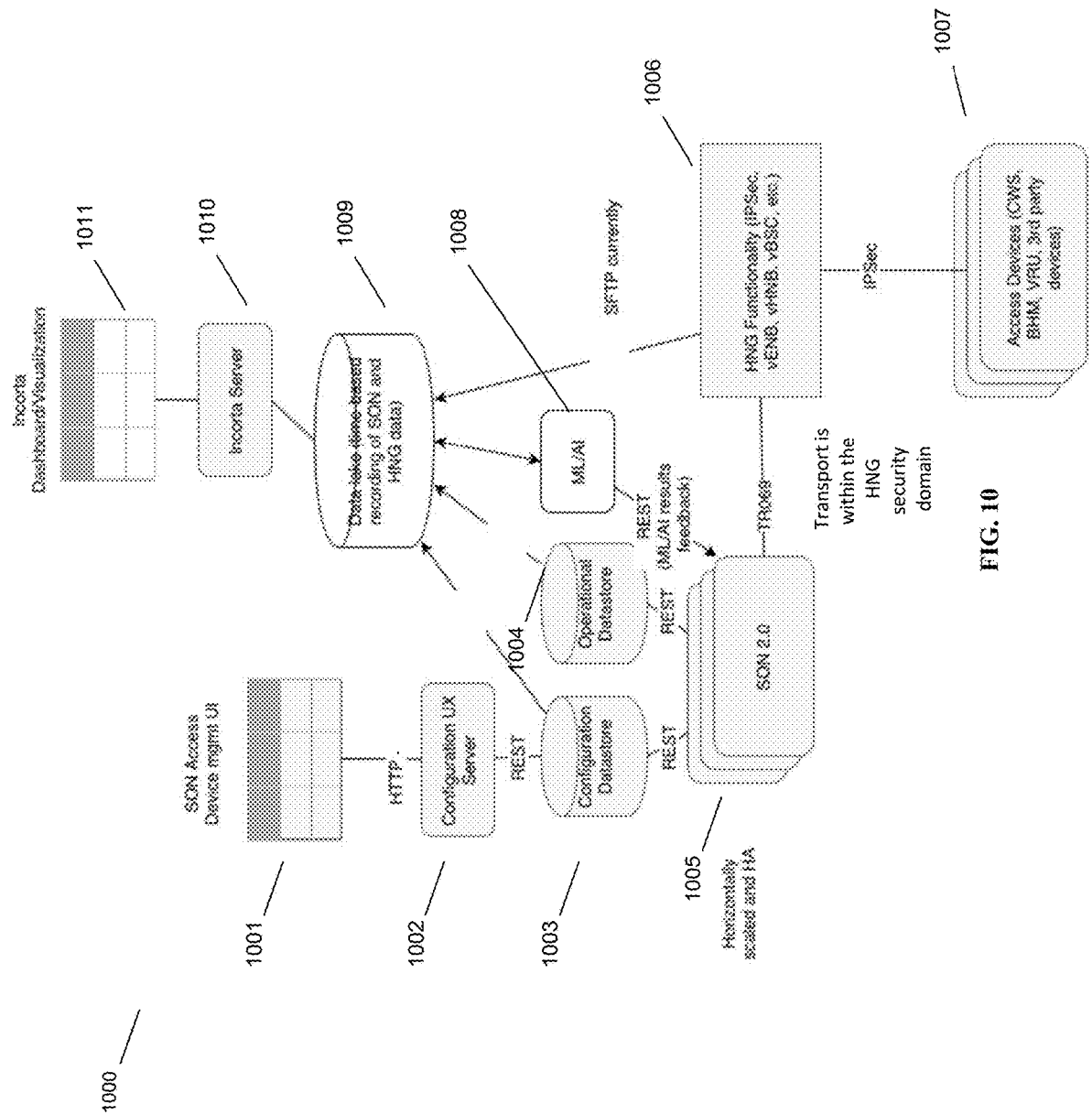
FIG. 10 is a second diagram showing a network architecture of a SON deployment, in accordance with some embodiments.
Figure 11:
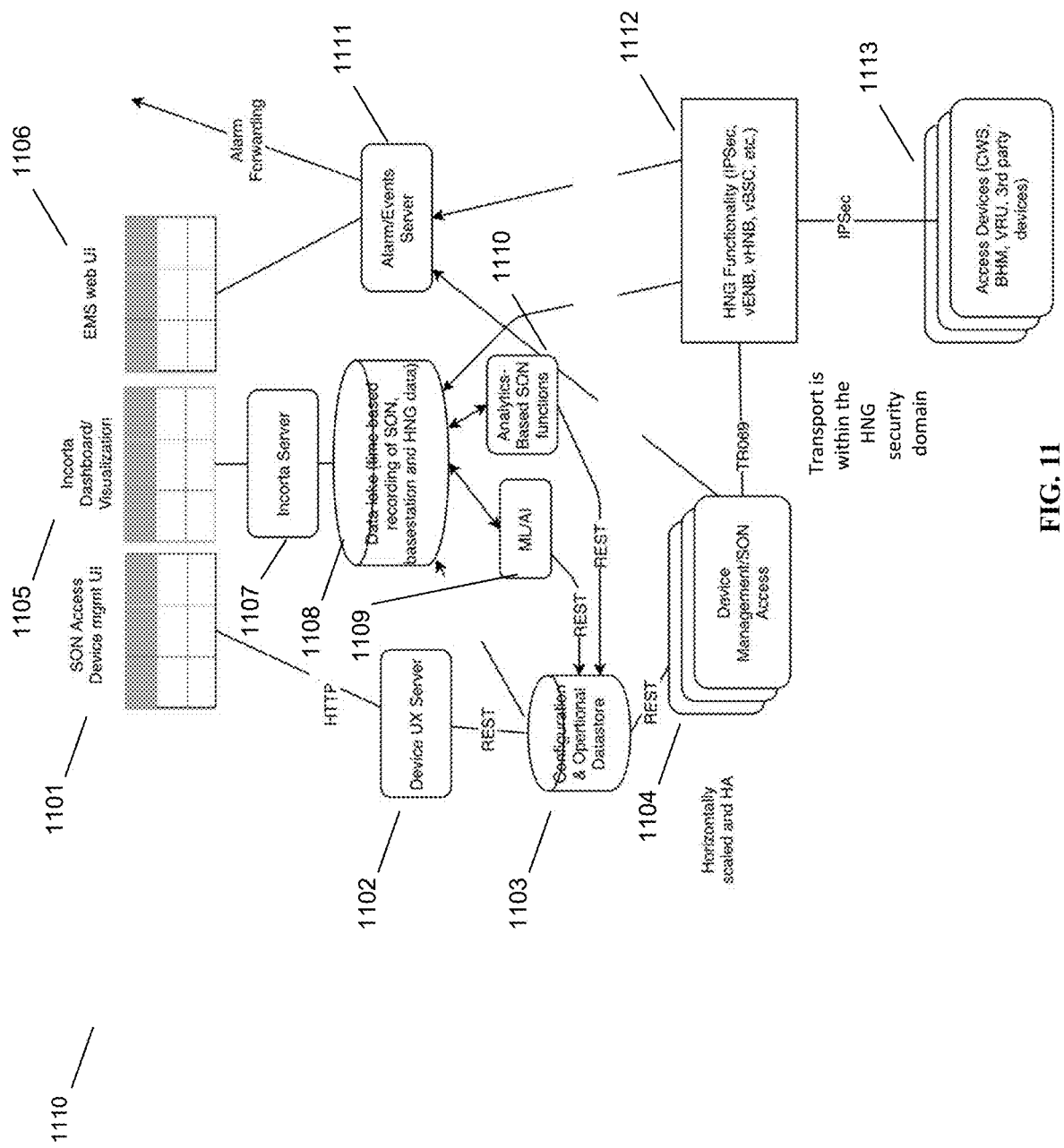
FIG. 11 is a third diagram showing a network architecture of a SON deployment, in accordance with some embodiments.

FIGS. 9-11 shows a model architecture suitable for a REST implementation. FIG. 9 is a first diagram showing a network architecture of a SON deployment, in accordance with some embodiments. Access devices 907, including for example any base station or RAN, including any virtualization thereof, and including any RAT, are coupled via IPsec to node 906, which schematically represents a plurality of core network functions that may be virtualized and/or provided across multiple machines or virtual instances. For example, node 906 may provide IPsec functionality, virtual eNodeB (veNB) for 4G, virtual home NodeB (vHNB) for 3G, virtual base station controller (vBSC) for 2G, etc. Transport of UE data and management data is secured as it is within the HNG security domain. The plurality of RAN nodes 907 are managed by the core network node 906 and core network node 906 also passes on aggregate data or even the underlying granular data to the SON system 905.

SON 905 receives core network data from node 906 pertaining to the health, performance, and configuration of the RAN, and performs network management functions based on the core network data. The network management functions may be performed in a plurality of containers, in some embodiments. Horizontal scalability and high availability may be provided, in some embodiments, using containers, virtual machines, or a scalable data bus in some embodiments. Individual SON functions may be segregated into different virtual machines or containers, providing increased reliability and scalability, in some embodiments. Examples of SON features include: turning devices/sectors/carriers/nodes/features on or off; tuning configuration parameters/thresholds; assigning collective or individual UEs to particular groups or sets or QoS or QCI; grouping of RAN nodes or UEs; scheduling any such SON activities etc. In some embodiments TR069 or another protocol is used for the data transport between 906 and 905. Data transport is secured via IPsec.

Continuing on, in some embodiments, HTTP/2.0 and REST technologies are used to provide dynamic, resilient, lightweight, and scalable transmission of configuration data, including to and from data stores 903 and 904. One data store 903 is used for configuration data, and another data store is used 904 for operational data, in some embodiments. Wherever a single datastore is identified, a plurality may be provided, and sharding/scalability is facilitated by the use of REST, in some embodiments. These data stores feed data to a configuration UX server 902, which runs a web user application that shows an access device management user interface (UI) 901 to the user, which provides capabilities to the administrative user, including providing aggregate data views of UE data allowing the administrative user to make decisions regarding network management profiles to be applied across nodes in the network.

FIG. 10 is a second diagram showing a network architecture of a SON deployment, in accordance with some embodiments. FIG. 10 shows this architecture with a virtualization dashboard 1011. A data lake 1009 is provided as well so that data is able to be stored and processed offline, including in a larger volume or quantity or throughput. Incorta 1010 is an example of a UX server that could be used. ML/AI functions 1008 may be provided as input to the data lake as well, which may provide feedback or data to SON functions 1005.

FIG. 11 is a third diagram showing a network architecture of a SON deployment, in accordance with some embodiments. FIG. 11 shows this architecture with a third visualizer, 1106, showing an element management system. A data lake 1009, 1108 makes all information available throughout the system. An entity management system (EMS) web UI may show all entities in the system. Alarms 1111 may be provided.

Figure 12:
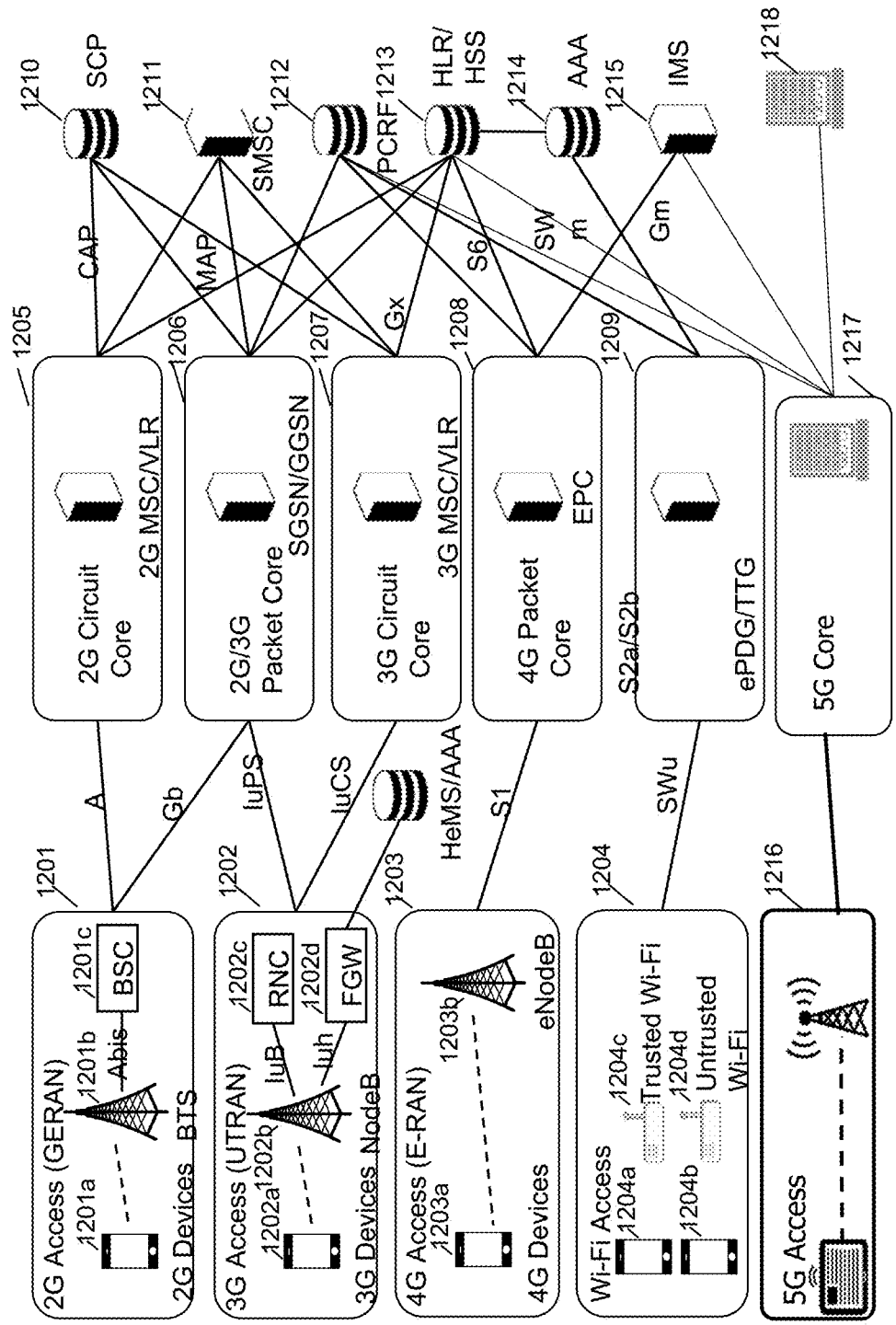
FIG. 12 is a schematic network architecture diagram for 3G and other-G prior art networks.

FIG. 12 is a schematic network architecture diagram for 3G and other-G prior art networks. The diagram shows a plurality of "Gs," including 2G, 3G, 4G, 5G and Wi-Fi. 2G is represented by GERAN 1201, which includes a 2G device 1201a, BTS 1201b, and BSC 1201c. 3G is represented by UTRAN 1202, which includes a 3G UE 1202a, nodeB 1202b, RNC 1202c, and femto gateway (FGW, which in 3GPP namespace is also known as a Home nodeB Gateway or HNBGW) 1202d. 4G is represented by EUTRAN or E-RAN 1203, which includes an LTE UE 1203a and LTE eNodeB 1203b. Wi-Fi is represented by Wi-Fi access network 1204, which includes a trusted Wi-Fi access point 1204c and an untrusted Wi-Fi access point 1204d. The Wi-Fi devices 1204a and 1204b may access either AP 1204c or 1204d. In the current network architecture, each "G" has a core network. 2G circuit core network 1205 includes a 2G MSC/VLR; 2G/3G packet core network 1206 includes an SGSN/GGSN (for EDGE or UMTS packet traffic); 3G circuit core 1207 includes a 3G MSC/VLR; 4G circuit core 1208 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 1230, the SMSC 1231, PCRF 1232, HLR/HSS 1233, Authentication, Authorization, and Accounting server (AAA) 1234, and IP Multimedia Subsystem (IMS) 1235. An HeMS/AAA 1236 is present in some cases for use by the 3G UTRAN. The diagram is used to indicate schematically the basic functions of each network as known to one of skill in the art, and is not intended to be exhaustive. For example, 5G core 1217 is shown using a single interface to 5G access 1216, although in some cases 5G access can be supported using dual connectivity or via a non-standalone deployment architecture.

Noteworthy is that the RANs 1201, 1202, 1203, 1204 and 1236 rely on specialized core networks 1205, 1206, 1207, 1208, 1209, 1237 but share essential management databases 1230, 1231, 1232, 1233, 1234, 1235, 1238. More specifically, for the 2G GERAN, a BSC 1201c is required for Abis compatibility with BTS 1201b, while for the 3G UTRAN, an RNC 1202c is required for Iub compatibility and an FGW 1202d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The system may include 5G equipment. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Figure 13:
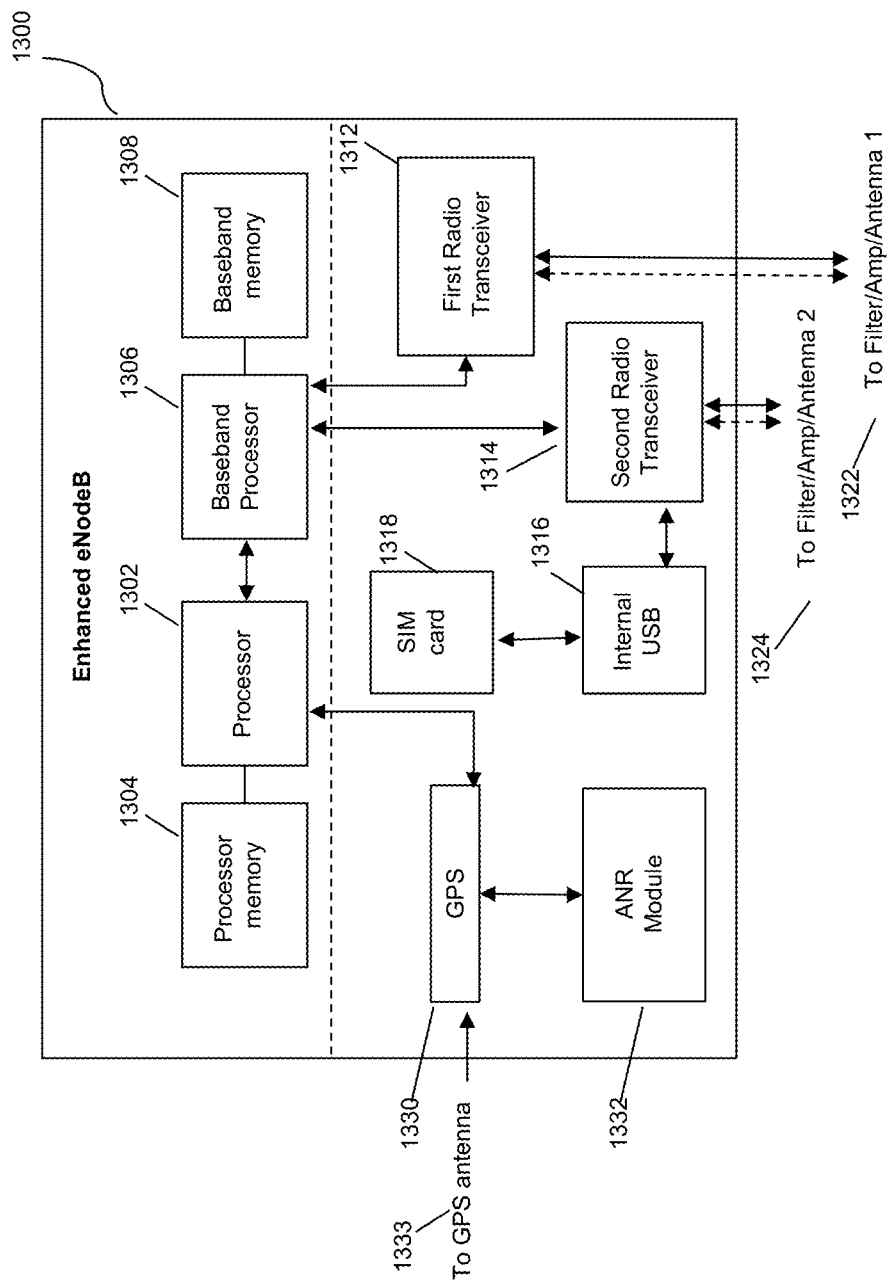
FIG. 13 is diagram of an enhanced eNodeB for performing the methods described herein, in accordance with some embodiments.

FIG. 13 shows an enhanced eNodeB for performing the methods described herein, in accordance with some embodiments. eNodeB 1300 may include processor 1302, processor memory 1304 in communication with the processor, baseband processor 1306, and baseband processor memory 1308 in communication with the baseband processor. Mesh network node 1300 may also include first radio transceiver 1310 and second radio transceiver 1314, internal universal serial bus (USB) port 1316, and subscriber information module card (SIM card) 1318 coupled to USB port 1316. In some embodiments, the second radio transceiver 1314 itself may be coupled to USB port 1316, and communications from the baseband processor may be passed through USB port 1316. The second radio transceiver may be used for wirelessly backhauling eNodeB 1300. The enhanced eNodeB is suitable for functional splits as shown in, e.g., FIGS. 7-8.

Processor 1302 and baseband processor 1306 are in communication with one another. Processor 1302 may perform routing functions, and may determine if/when a switch in network configuration is needed. Baseband processor 1306 may generate and receive radio signals for both radio transceivers 1310 and 1314, based on instructions from processor 1302. In some embodiments, processors 1302 and 1306 may be on the same physical logic board. In other embodiments, they may be on separate logic boards. Functional splits will enable some baseband processing to happen within the enhanced eNodeB and some baseband processing to happen within a separate BBU (CU). In some embodiments, all baseband processing will happen at a BBU and the baseband processor will instead be replaced by a fronthaul bus processor.

Processor 1302 may identify the appropriate network configuration, and may perform routing of packets from one network interface to another accordingly. Processor 1302 may use memory 1304, in particular to store a routing table to be used for routing packets. Baseband processor 1306 may perform operations to generate the radio frequency signals for transmission or retransmission by both transceivers 1310 and 1310. Baseband processor 1306 may also perform operations to decode signals received by transceivers 1310 and 1314. Baseband processor 1306 may use memory 1308 to perform these tasks.

The first radio transceiver 1310 may be a radio transceiver capable of providing LTE eNodeB functionality, and may be capable of higher power and multi-channel OFDMA. The second radio transceiver 1314 may be a radio transceiver capable of providing LTE UE functionality. Both transceivers 1310 and 1314 may be capable of receiving and transmitting on one or more LTE bands. In some embodiments, either or both of transceivers 1310 and 1314 may be capable of providing both LTE eNodeB and LTE UE functionality. Transceiver 1310 may be coupled to processor 1302 via a Peripheral Component Interconnect-Express (PCI-E) bus, and/or via a daughtercard. As transceiver 1314 is for providing LTE UE functionality, in effect emulating a user equipment, it may be connected via the same or different PCI-E bus, or by a USB bus, and may also be coupled to SIM card 1318. First transceiver 1310 may be coupled to first radio frequency (RF) chain (filter, amplifier, antenna) 1322, and second transceiver 1314 may be coupled to second RF chain (filter, amplifier, antenna) 1324.

SIM card 1318 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 1300 is not an ordinary UE but instead is a special UE for providing backhaul to device 1300.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 1310 and 1314, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 1302 for reconfiguration.

A GPS module 1330 may also be included, and may be in communication with a GPS antenna 1332 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 1332 may also be present and may run on processor 1302 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 14:
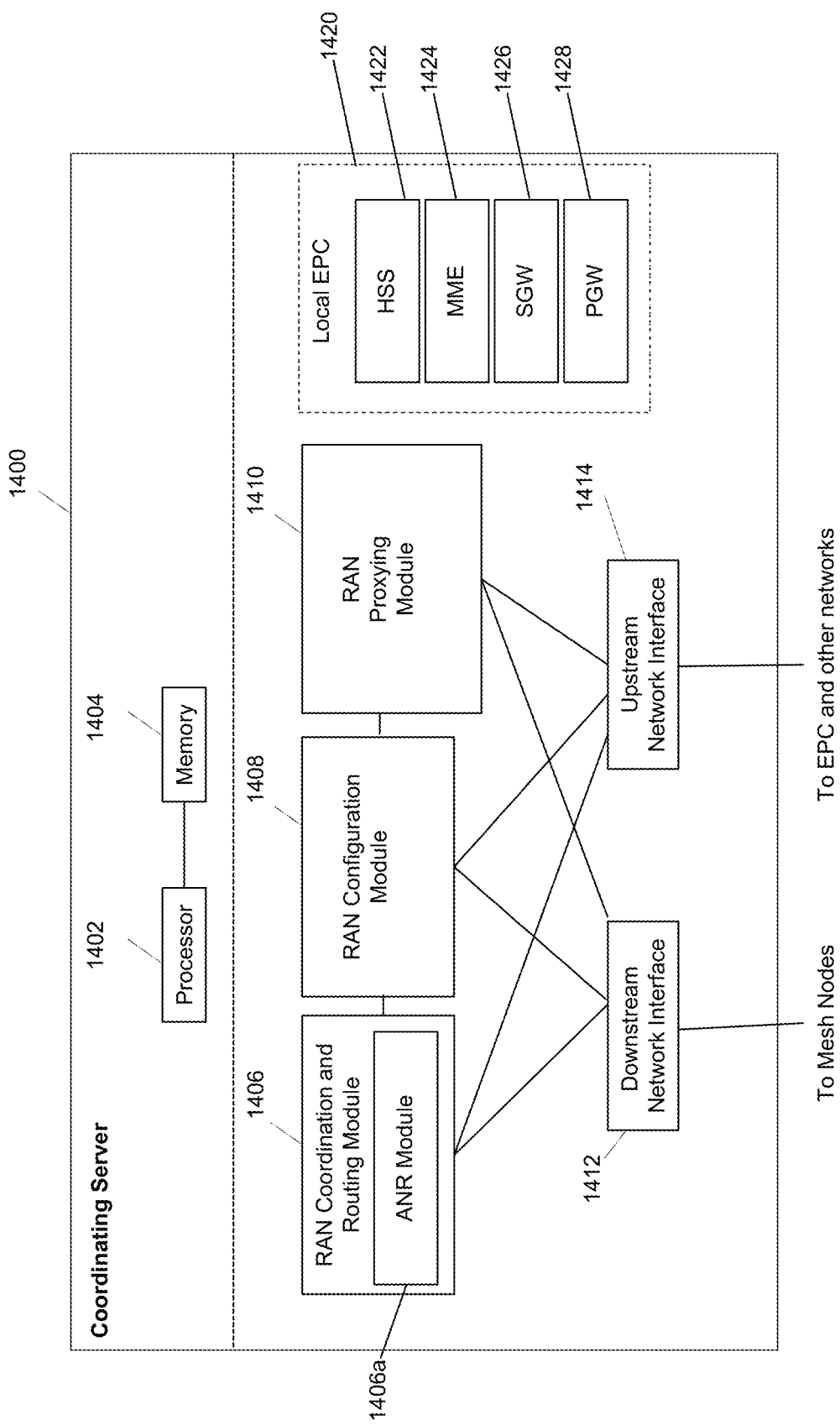
FIG. 14 is a diagram of is a coordinating server for providing services and performing methods as described herein, in accordance with some embodiments.

FIG. 14 is a coordinating server for providing services and performing methods as described herein, in accordance with some embodiments. Coordinating server 1400 includes processor 1402 and memory 1404, which are configured to provide the functions described herein. Also present are radio access network coordination/routing (RAN Coordination and routing) module 1406, including ANR module 1406a, RAN configuration module 1408, and RAN proxying module 1410. The ANR module 1406a may perform the ANR tracking, PCI disambiguation, ECGI requesting, and GPS coalescing and tracking as described herein, in coordination with RAN coordination module 1406 (e.g., for requesting ECGIs, etc.). In some embodiments, coordinating server 1400 may coordinate multiple RANs using coordination module 1406. In some embodiments, coordination server may also provide proxying, routing virtualization and RAN virtualization, via modules 1410 and 1408. In some embodiments, a downstream network interface 1412 is provided for interfacing with the RANs, which may be a radio interface (e.g., LTE), and an upstream network interface 1414 is provided for interfacing with the core network, which may be either a radio interface (e.g., LTE) or a wired interface (e.g., Ethernet).

Coordinator 1400 includes local evolved packet core (EPC) module 1420, for authenticating users, storing and caching priority profile information, and performing other EPC-dependent functions when no backhaul link is available. Local EPC 1420 may include local HSS 1422, local MME 1424, local SGW 1426, and local PGW 1428, as well as other modules. Local EPC 1420 may incorporate these modules as software modules, processes, or containers. Local EPC 1420 may alternatively incorporate these modules as a small number of monolithic software processes. Modules 1406, 1408, 1410 and local EPC 1420 may each run on processor 1402 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the 5G standard or the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 5G technology is described, the inventors have understood that other RATs have similar equivalents, such as a gNodeB and eNB in 4G. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A system, comprising;
   a heterogeneous network gateway (HNG) acting as a gateway for control functions for a plurality of radio access technology (RAT) networks, wherein the HNG including a processor and memory;
   at least one real-time Self Optimizing Network (SON) Virtual Network Function (VRF) configured in a container and communicatively coupled to the HNG;
   a configuration data store communicatively coupled to the at least one SON VNF via a first representational state transfer (REST) interface;
   a operational data store communicatively coupled to the at least one SON VNF via a second representational state transfer (REST) interface;
   wherein data from connected devices is forwarded to the HNG within an HNG security domain;
   wherein the data is forwarded to the at least one SON VNF and processed into configuration data and operational data; and wherein the configuration data is processed by a user experience (UX) server and presented to a user.

2. The system of claim 1 wherein the data is used for at least one of planning, deployment, optimization and maintenance.

3. The system of claim 1 wherein the SON VRF enables self-optimization and seamless mobility across a plurality of radio access technologies (RATs).

4. The system of claim 1 wherein the SON VRF enables self-optimization and seamless mobility across a plurality of fronthauls or backhauls.

5. The system of claim 1 wherein the SON VRF enables self-optimization and seamless mobility across a plurality of slices.

6. The system of claim 1 wherein the SON VRF enables self-optimization and seamless mobility across a plurality of services.

7. A method of providing a real-time Self Optimizing Network (SON) Virtual Network Function (VRF) comprising:
   forwarding data from connected devices to the SON VRF via a network security domain;
   processing the data from the connected devices to obtain operational data and configuration data;
   forwarding the operational data to a operational data store using a first representational state transfer (REST) interface;
   forwarding the configuration data to a configuration data store using a second REST interface; and
   displaying results to a user via an operational dashboard enabling report and analysis via analytic workspaces.

8. The method of claim 7 further comprising using the data for at least one of planning, deployment, optimization and maintenance.

9. The method of claim 7 further comprising using SON VRF for self-optimization and seamless mobility across a plurality of radio access technologies (RATs).

10. The method of claim 7 further comprising using SON VRF for self-optimization and seamless mobility across a plurality of fronthauls or backhauls.

11. The method of claim 7 further comprising using SON VRF for self-optimization and seamless mobility across a plurality of slices.

12. The method of claim 7 further comprising using SON VRF for self-optimization and seamless mobility across a plurality of services.

13. A non-transitory computer-readable medium containing instructions for providing a real-time Self Optimizing Network (SON) Virtual Network Function (VRF), which, when executed, cause a system to perform steps comprising:
   forwarding data from connected devices to the SON VRF via a network security domain;
   processing the data from the connected devices to obtain operational data and configuration data;
   forwarding the operational data to a operational data store using a first representational state transfer (REST) interface;
   forwarding the configuration data to a configuration data store using a second REST interface; and
   displaying results to a user via an operational dashboard enabling report and analysis via analytic workspaces.

14. The non-transitory computer-readable medium of claim 13 further comprising instructions for using the data for at least one of planning, deployment, optimization and maintenance.

15. The non-transitory computer-readable medium of claim 13 further comprising instructions for using SON VRF for self-optimization and seamless mobility across a plurality of radio access technologies (RATs).

16. The non-transitory computer-readable medium of claim 13 further comprising instructions for using SON VRF for self-optimization and seamless mobility across a plurality of fronthauls or backhauls.

17. The non-transitory computer-readable medium of claim 13 further comprising instructions for using SON VRF for self-optimization and seamless mobility across a plurality of slices.

18. The non-transitory computer-readable medium of claim 13 further comprising instructions for using SON VRF for self-optimization and seamless mobility across a plurality of services.

* * * * *